United States Patent [19]
Schempp et al.

[11] 3,812,275
[45] May 21, 1974

[54] STEEL PRODUCTION METHOD AND APPARATUS

[75] Inventors: Eberhard G. Schempp; Jai K. Pearce, both of Pittsburgh, Pa.

[73] Assignee: Pennsylvania Engineering Corporation, Pittsburgh, Pa.

[22] Filed: Feb. 26, 1973

[21] Appl. No.: 335,468

[52] U.S. Cl. .......................................... 13/10, 13/2
[51] Int. Cl. ....................... F27b 14/02, F27b 14/06
[58] Field of Search .............................. 13/2, 9, 10

[56] References Cited
UNITED STATES PATENTS

| | | | |
|---|---|---|---|
| 1,411,157 | 3/1922 | Bradley | 13/10 |
| 3,197,539 | 7/1965 | Hinds | 13/9 |
| 3,021,376 | 2/1962 | Vedder et al. | 13/9 |
| 3,379,815 | 4/1968 | Parker | 13/2 |

*Primary Examiner*—Roy N. Envall, Jr.
*Attorney, Agent, or Firm*—Fred Wiviott; Ralph G. Hohenfeldt; John C. Cooper, II

[57] ABSTRACT

An electric arc furnace pivotable between a first position wherein a gas delivery tuyere system is above the level of a metal charge for preheating the same and a second position wherein the tuyere system is below the level of metal charge to permit the injection of gases, fluxes, ores, alloying additions and other materials for converting a metal charge. A first furnace hood is engageable with the furnace when in its first position for positioning electrodes in the furnace and a second hood is engageable with the furnace when in its second position for withdrawing gases evolved during the gas blowing period.

13 Claims, 6 Drawing Figures

PATENTED MAY 21 1974 3,812,275

STEEL PRODUCTION METHOD AND APPARATUS

BACKGROUND OF THE INVENTION

In the production of steel, it is common practice to perform distinct process steps either in the same vessel or to perform a first portion of the process in one vessel and a second portion in a separate vessel. For example, electric arc furnaces are commonly employed to melt scrap or ores and to then further process melt in the arc furnace or in a converter, such as a BOF vessel. The melt down period in an electric arc furnace is generally the most expensive in terms of both power and electrode consumption. In order to minimize the duration of the melt down period, one prior art practice was to preheat the scrap before charging. The use of multiple vessels to process steel melts has not been wholly satisfactory because it involves costly additional handling and equipment.

SUMMARY OF THE INVENTION

An object of the invention is to provide an electric arc furnace capable of performing its multiple process functions.

A further object of the invention is to provide an electric arc furnace which is more versatile than conventional arc furnaces as to the process to be performed therein.

Another object of the invention is to provide an electric arc furnace which is more economical to operate than conventional electric arc furnaces.

A still further object of the invention is to provide a more efficient and economical method of processing molten metal.

Yet another object of the invention is to provide an electric arc furnace wherein various melting and conversion steps may be performed.

These and other objects and advantages of the instant invention will become more apparent from the detailed description thereof taken with the accompanying drawings.

In general, the invention comprises a pivotal electric arc furnace having a tuyere system which is above the level of the metal charge when the furnace is in a first position and which is below the surface of the metal charge when the furnance is pivoted to a second position. A first hood is movable into engagement with the furnace's open upper end when the latter is in a first position for disposing electrodes adjacent the furnace charge. A gas collecting hood is movable into engagement with the furnace when the latter is in its second position.

DESCRIPTION OF A PREFERRED EMBODIMENT

Figure 1:
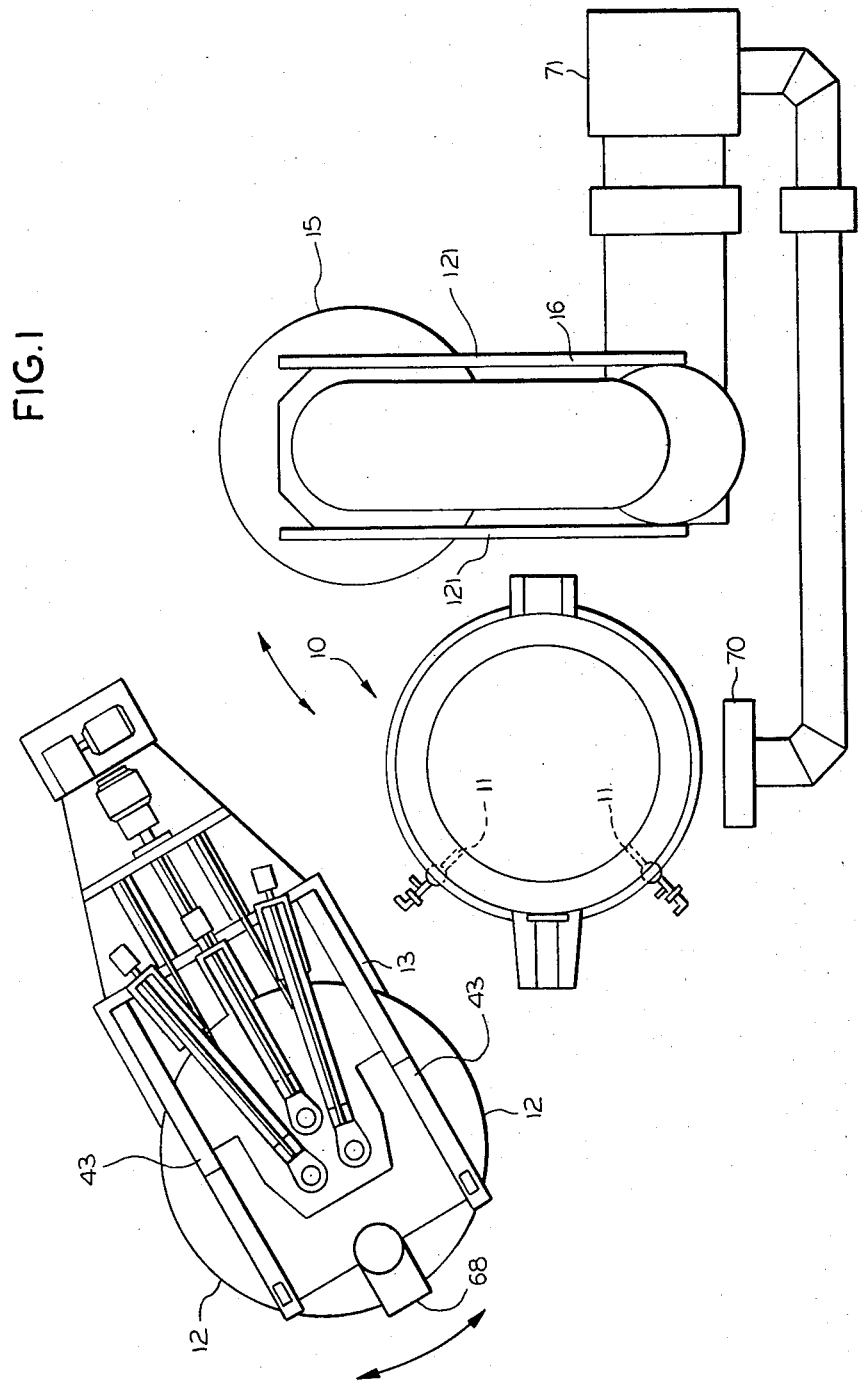
FIG. 1 is a plan view of an electric arc furnace system according to the present invention.

FIG. 1 shows the furnace system according to the preferred embodiment of the present invention to include a furnace vessel 10 which is pivotal between first and second positions. In addition, one or more tuyere assemblies 11 extend through the side wall of vessel 10. A first cover 12 is mounted on a pivotal support structure 13 which is adapted to swing the cover 12 into and out of alignment with the top of the vessel 10 when the latter is in a first pivoted position. In addition, a gas collecting hood 15 is swingably mounted on a pivot support structure 16 for engaging the vessel 10 when the latter is in a second pivoted position.

Figure 2:
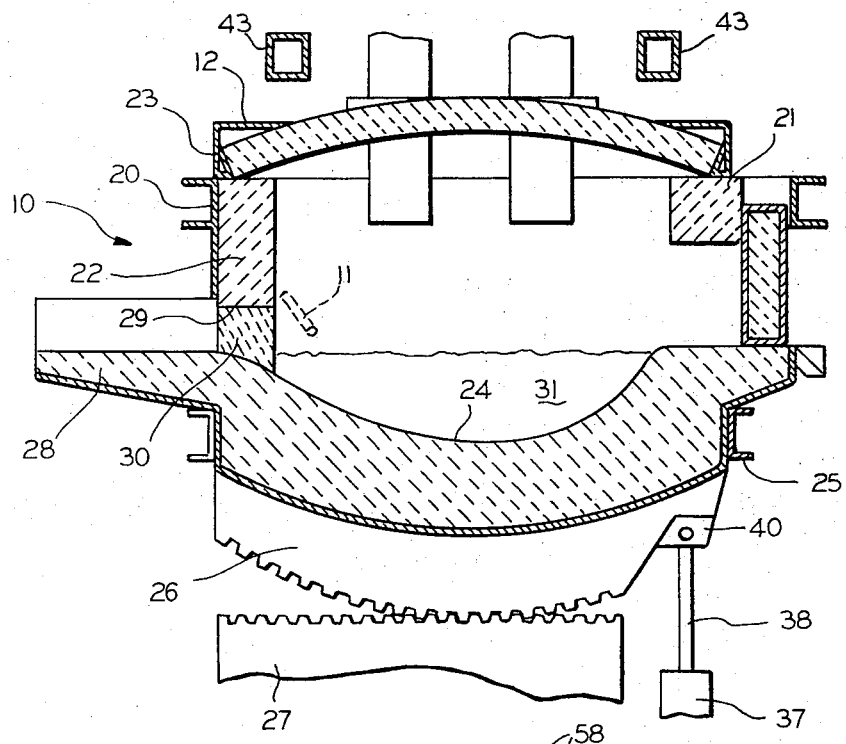
FIG. 2 is a vertical section of the furnace vessel in its upright position with the electrode furnace cover in position.
Figure 3:
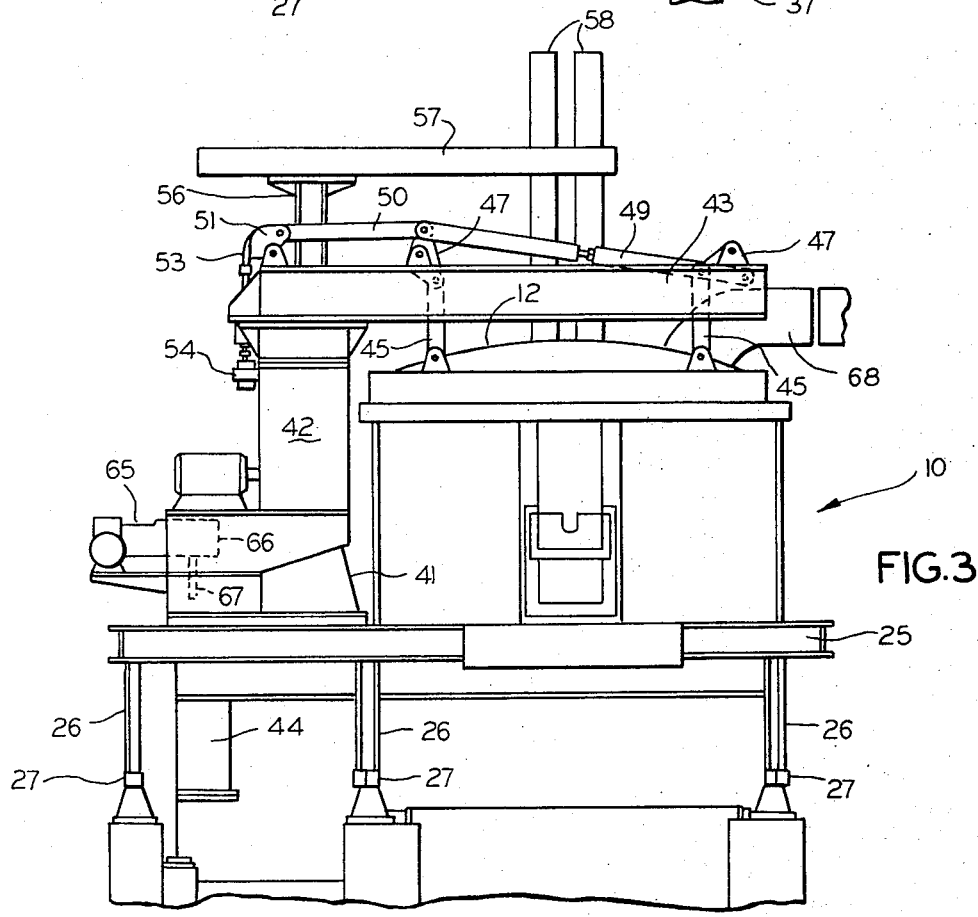
FIG. 3 is a side elevational view of the electric arc furnace illustrating the cover support and positioning assembly.

As shown in FIGS. 1, 2 and 3, the furnace vessel 10 includes an outer metallic shell 20 and a refractory lining 21. In the case of a basic furnace, the refractory lining would be composed of any suitable basic material, such as magnesite or high alumina brick. While in an acid furnace the lining would generally be silica brick or ground ganister mix. The vessel 10 generally includes a cylindrical side wall 22 which terminates at its upper end 23 in an opening and at its lower end in a dished hearth 24. A main platform 25 supports the vessel 10 and is in turn mounted on a rocker assembly 26 which is adapted to be rocked on a gear rack 27 by a conventional arc furnace tilting mechanism which is discussed below.

Located on one side of the vessel 10 and in the direction of pivotal motion is a pouring spout 28 aligned with an opening 29 formed in the cylindrical side wall 22. When the tuyeres 11 are located adjacent spout 28, opening 29 is closed by a refractory plug 30 so that the metallic bath 31 will not discharge from spout 30 when vessel 10 is tilted to cover tuyeres 11 as will be discussed below. A slag opening 32 and a slag spout 34 are formed in wall 22 at a point diametrically opposite the pouring spout 28. A slag door 35 is movable vertically into and out of a closed position relative to the opening 32 by means not shown but which are well known in the art.

The vessel 10 may be tilted in any manner well known in the art such as by a hydraulic motor 37 which is pivotally coupled by a link 38 to a plate 40 affixed to the vessel 10. It will be appreciated that when the link 38 is moved downwardly as viewed in FIG. 2, the vessel 10 will rock clockwise while upward movement of link 38 will rock said vessel in opposite direction. FIG. 2 shows the vessel 10 in an upright position such that the upper surface of the melt 31 will be below the inner end of tuyere assemblies 11 as will be described in detail hereinbelow.

Figure 6:
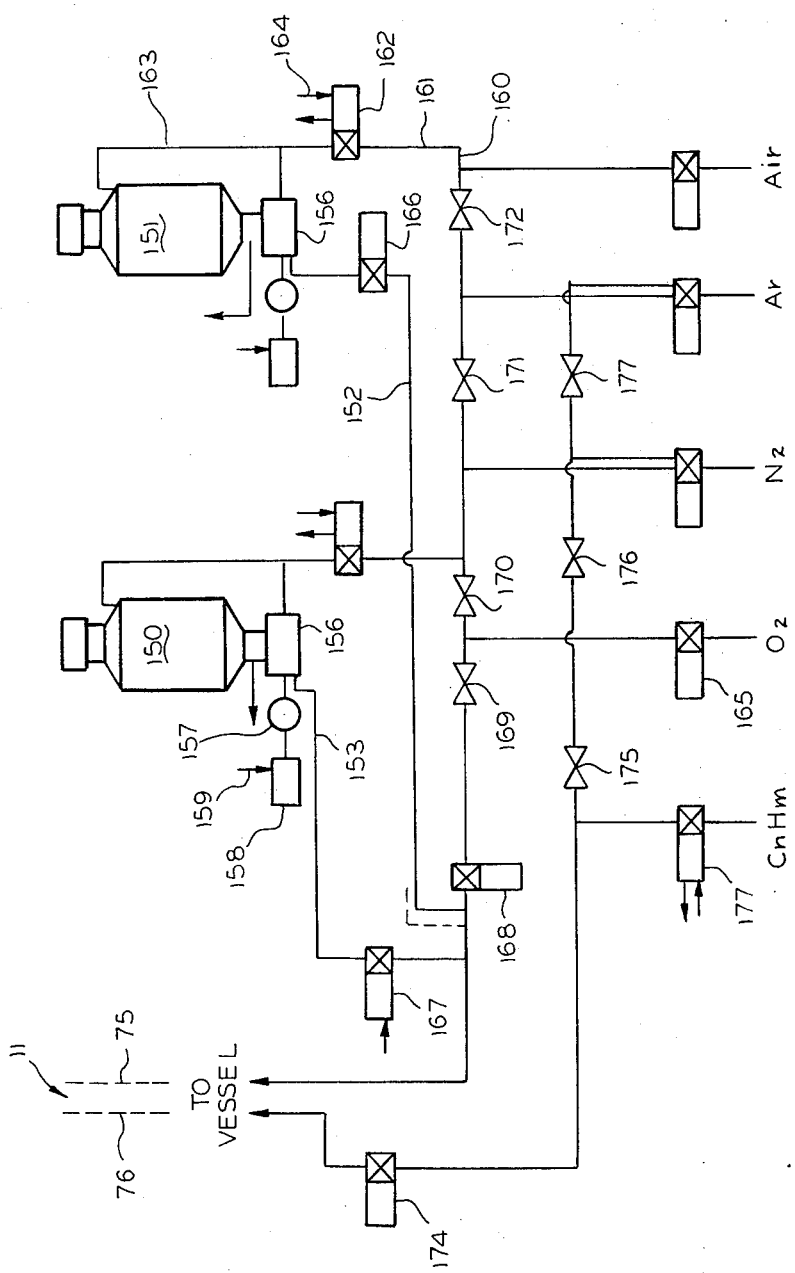
FIG. 6 schematically illustrates means for controlling the delivery of gases and other materials in the tuyeres of the vessel shown in FIGS. 1–3.

Referring now to FIGS. 1, 2 and 6, the construction of the first furnace cover 12 and its pivotal support structure 13 will now be described. The pivoting cover support structure 13 has a turret bearing structure 44 which is adapted to sustain thrust and radial loads on its internal bearings, not shown. The internal construction of the turret 30 will not be described but is well known in the art. It is sufficient for present purposes to be aware that a shaft, not shown, extends down into the turrent and supports the swingable furnace cover superstructure 13.

The structure 13 includes a base 41 to which a vertical column 42 is secured. Fastened to the top of the column 42 are a pair of horizontally extending spaced apart coplanar beams 43. The cover 12 of the furnace is supported on beams 43 by means of links 45. There are at least four such links, only two of which are visible in FIG. 3. The cover support links 45 are respectively connected to bell cranks 47 which are journaled for pivoting on beams 43. The bell cranks are interconnected with an adjustable link 49 as they are also connected by means of a link 50 to a crank 51 pivotally mounted on beam 43. When the crank 51 is rocked counterclockwise by application of a tensile force to a cable 53 by a motor drive 54, the furnace roof 12 will be lifted upward, segment 51 is rocked to lift roof 12. Extending vertically through column 42 of structure 13 and swingable with the latter are three aligned electrode support columns 56 which support arms such as 57. At their ends, the arms engage carbon or graphite electrodes 58.

As those skilled in the art will appreciate, the number of electrodes will be determined by whether alternating or direct current energy is employed and whether the alternating current systems are single or polyphase. In the illustrative embodiment, three electrodes 58 are triangularly arranged as viewed from the top and extend down through the cover 12. A suitable hydraulic or electrical motor 59 is provided for moving the electrode support columns 56 vertically in a manner well known in the art as the conditions of the arc furnace require and to elevate the electrodes so that the latter may be swung with structure 13 without having their lower ends collide with furnace body 22. It will also be understood that each electrode 58 is connected for being energized by a suitable cable and clamp (not shown) to a source of electrical energy (not shown).

A motor 65 is mounted on base 41 of the superstructure for driving a speed reducer 66 whose output shaft 67 is suitably mechanically connected to drive the shaft, not shown, which occupies turret bearing structure 40 and on which the support structure 13 is supported. Thus, one may see that when the cover 12 is lifted, the motor 65 may be operated to cause support structure 13 to swing between a position clear of the furnace as seen in FIG. 1 to a point in alignment over the vessel 10.

As shown in FIG. 3, a smoke elbow 68 is affixed to the cover 12 over an opening, not shown. When roof 12 is in engagement with the vessel 10 and the latter is in its unpivoted position shown in FIG. 3, the remote end of elbow 68 is disposed adjacent the terminal end of a duct 70, the other end of which is connected to a gas cleaning system through a suitable valve 72 as shown in FIG. 1. In this manner, smoke gases and other pollutants produced when the electrodes are being operated may be collected and properly treated.

Figure 4:
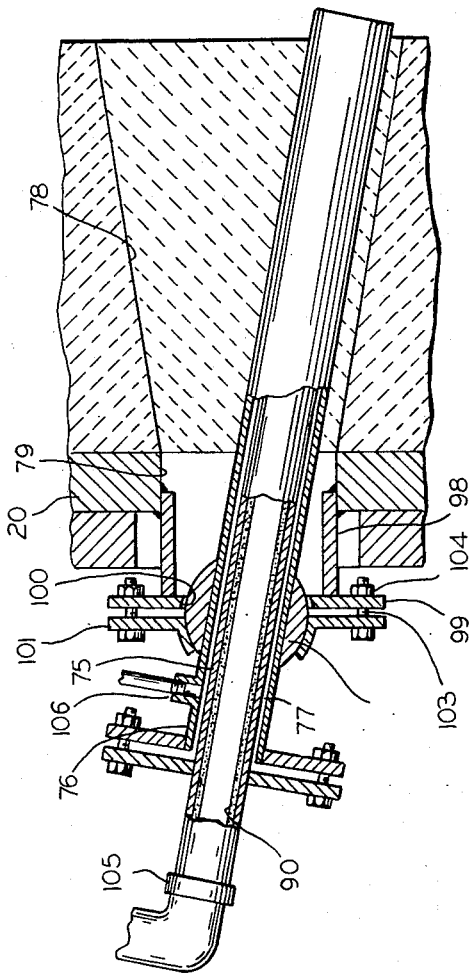
FIG. 4 is a sectional view of tuyeres employed with the furnace vessel illustrated in FIGS. 1–3.

The tuyere assemblies 11 extend inwardly through the sides 22 of furnace body 10 and are so position that their inner ends 74 are disposed above the surface 35 of the melt 31 when the furnace is in an unpivoted position as seen in FIG. 2. When the furnace body 10 is pivoted to its position shown in FIG. 5, the ends 74 of tuyere assemblies 11 are disposed below the surface of melt 31. The tuyere assemblies 11 are identical and only one will be discussed in relation to FIG. 4 which shows concentric outer and inner tuyere pipes 75 and 76 respectively which are spaced apart to form an annular gap 77 therebetween. The pipes 75 and 76 extend through a frusto-conical opening 78 formed in the lining 21 and an aligned circular opening 79 formed in the metal shell 20. The outer pipe 76 extends through and is affixed in the bore 80 of a ball 81. Registerable flanges 85 and 86 are respectively secured to the inner tuyere pipe section 75 and the outer tuyere pipe 76 whereby said pipes may be secured in a concentric relation by bolts 87 extending through suitable aligned apertures. A ceramic liner 90 may be disposed within pipe 75 to protect the same from excessive wear as the result of powdered materials which may be entrained in the gas injected in pipe 75 as will be discussed more fully below.

Each tuyere assembly 11 is secured to the side of the vessel 10 by means of a short cylindrical section 98 which is secured at one end in opening 79 and which supports an annular flange 99 at its other end. Flange 99 has an inner, generally frusto-conical surface 100 for engaging one side of ball 80. A ring clamp 101 is disposed in general parallelism with flange 99 and its inner periphery 102 formed as a spherical section for engaging the ball 81. Any suitable clamping means, such as nuts 103 and bolts 104 extending through aligned opening in flange 99 and ring 101 clamp ball 81 and the tuyere 11 in position. The inner and outer tuyere pipes 75 and 76 may respectively be connectable to suitable sources of pressurized gases through pipe couplings 105 and 106.

It will be appreciated that tuyere assembly 11 may be initially positioned in any one of a number of possible angular positions relative to the refractory lining 12 after which it may be retained in this position by tightening bolts 104. Thus, the tuyeres 11 may initially be oriented at any one of a wide range of vertical and horizontal angles relative to the vertical axis of the vessel 10. The range of angles will be determined by the apex angle of the circuit aperture 78 in lining 21, which in the illustrated embodiment is approximately 30°. In the illustrated embodiment, the tuyeres 11 are oriented so they point approximately toward the center of the melt 31. However, it may be desirable to orient the tuyeres at an angle relative to the center of the bath to promote mixing thereof when a pressurized gas is injected into the melt 31 as will be explained hereinbelow. When the tuyeres 11 have been oriented in their desired position, the respective openings 78 are filled with refractory mortar as previously described.

While the embodiment shown has two tuyere assemblies 11, it will be apparent to those skilled in the art that a single tuyere could be provided or, on the other hand, more than two tuyeres could be provided if so desired.

Figure 5:
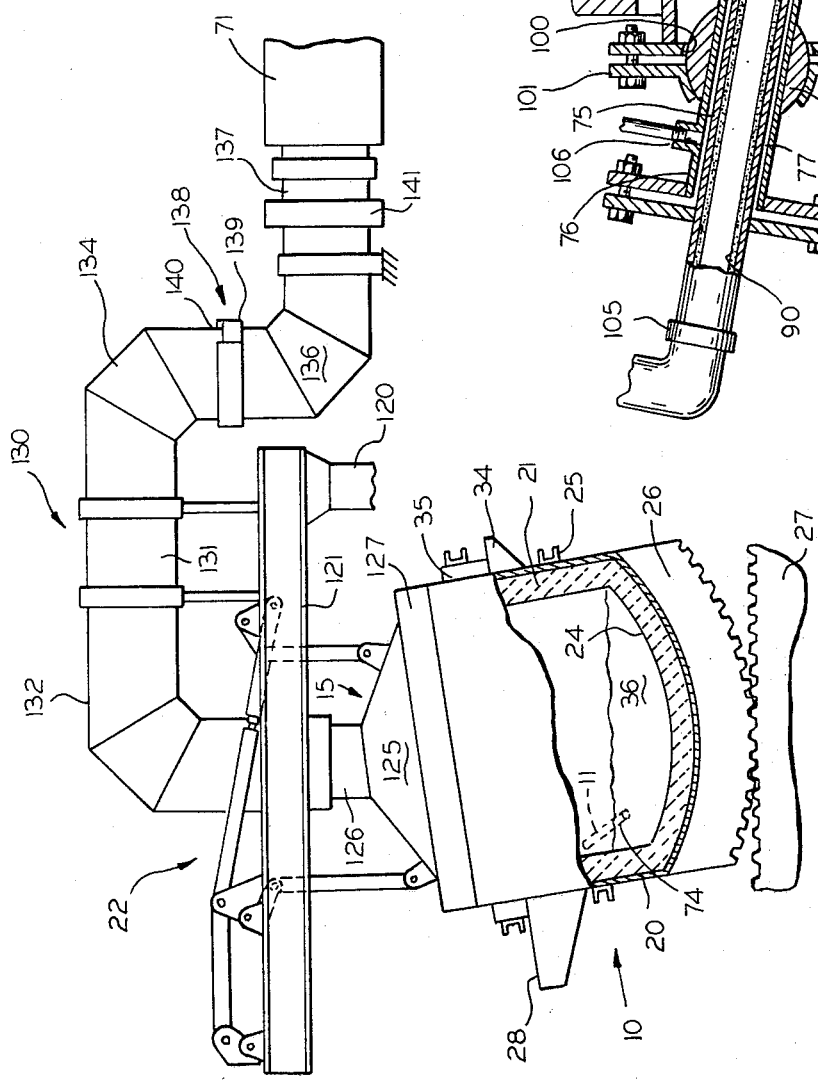
FIG. 5 is a side elevational view in partial section of the furnace vessel with the gas removal hood in position.

As is shown in FIGS. 1 and 5, the gas collecting hood 15 is adapted to be pivoted by hood support structure 16 from a remote position into position over the vessel 10 whereupon it may be lowered into engagement with the open upper end 23 thereof when said vessel is in its tilted position shown in FIG. 5.

The hood support assembly 16 is substantially similar to the support structure 13 for pivoting the first furnace cover 12. Specifically, the hood support assembly 16 includes a vertical column 120 having a pair of support beams 121 affixed to its upper end in spaced apart relation and extending horizontally therefrom. The hood 15 is supported from the beams 121 by means of a motor operable bell crank and linkage assembly 122.

Those skilled in the art will appreciate that the hood 15 may be moved vertically toward and away from the vessel 10 by means of the assembly 122 and then pivoted from a position above said furnace body to a remote position by rotation of the column 120. The operation of the linkage assembly 122 and the means for rotating column 120 in FIG. 5 is similar to the construction and operation of the corresponding apparatus shown in FIG. 3 for raising and swinging the cover 12 and, accordingly, this description will now be repeated for the sake of brevity.

The hood 15 may be of any well known type of construction such as a water cooled hollow-walled metallic structure or a refractory lined metallic shell. As seen in FIG. 5, the hood includes a generally frusto-conical center section 125 which terminates at its upper end in a vertically extending cylindrical pipe section 126 and a tapered cylindrical lower section 127 which forms a transition between the tilted upper end 23 of the vessel 10 and the horizontal lower end of frusto conical section 125. Also mounted on the support assembly 16 is a duct 130 which includes a central generally horizontal section 131 a first elbow 132 mounted above the hood 15 and a second elbow 134 which is mounted concentrically above the column 120. The lower end of elbow 132 is telescopingly received over the hood section 126. The lower end of elbow 134 is connected to the elbow 136 of a gas cleaning entrance conduit 137 through a sealed rotary joint 138. The joint 138 includes an annular trough 139 affixed to the upper end of elbow 136 and filled with a suitable liquid 140 such as water. The lower end of elbow 134 is disposed beneath the surface of the liquid 140 to provide a seal which permits rotation of the elbow 134 along with the hood 15 and support structure 16 while the elbow 136 remains stationary. A suitable valve 141 is disposed in conduit 137 for separating the hood 15 from the gas cleaning system 71 when the hood is out of its operative position.

The system for delivering various gases and process materials to the vessel 10 is schematically illustrated in FIG. 6. During the processing of molten metal in vessel 10, various powdered materials, such as lime, burnt lime, limestone, iron oxide, desulfurizing agents, fluorspar and various alloying agents may be entrained in the oxygen or other gas streams from pressure vessels 150 and 151 in accordance with process requirements. Only two pressure vessels 150 and 151 for containing powdered material are shown, but it will be understood that there will be as many such pressure vessels as there are types of powdered materials which are to be injected into the bath within the vessel.

Powdered materials may be delivered consecutively or concurrently to inner tuyere pipe 75 through pipes 152 and 153 for being entrained in the particular gas which is being injected into bath 31. In order to provide the desired proportion of powdered materials and the entraining gas, a suitable mixing device 156 may be provided, the details of which are not shown, but are well known in the art. For example, the device 156 may be of the type which withdraws powdered material from the vessel 80 and injects it into the gas stream. The device 156 may be operated by motive means 157 with a controller 158. The controller may be responsive to input signals from any suitable control source, as symbolized by the short arrowheaded line 159. A mixing device 156 is associated with each pressure vessel 150 and 151, respectively, and each is connected to as many sources of gas as might be blown in a particular installation. Thus, from a source of oxygen which is labeled $O_2$, oxygen may be delivered from a header 160 through a branch pipe 161, a remotely controllable valve 162 and a pipe 163 to mixing device 156. An arrow, such as 164, symbolizes that valve 162 receives control signals for throttling or turning off the flow of oxygen to mixing device 156. These control signals may be provided from any suitable control equipment (not shown).

Other control valves may also be interposed between mixing device 154 and the sources of other gases. However, only the afore-mentioned controllable valve 162, connected between an air source and mixing device 84, is shown for the sake of brevity. For example, there may be additional valves interposed between air, argon and nitrogen and gas sources which are respectively marked AIR, Ar and $N_2$. The other pressure vessels such as 150, containing powdered materials may also be supplied with these various gases through suitable pipes and valves, not shown.

The various gases may also be fed selectively into vessel 10 directly without entraining solid material if desired. The oxygen line, for instance, connects through remotely controllable valve 165 to gas header 160 which feeds through remotely controllable valve 166 to the inner tuyere pipe 75. Remote valves 167 and 168 for preventing reverse flow are also provided and there are also several valves 169–171 for variously directing and regulating gas flow. Similarly, remote controllable valve 174 and directional regulating valves 175–178 are provided to regulate and control the flow of various gases to the outer tuyere pipe 78. A hydrocarbon fluid such as propane, natural gas, light oil, manufactured gas and the like may be provided to outer tuyere pipe 75 through valves 174 and 177. Extending from each of the remote controlled valves is an arrow which symbolizes, as in respect to the previously discussed valves, that they are subject to control.

Upon the commencement of an operation of the arc furnace according to the invention, the roof 12 and electrodes 58 will normally be in a position away from the vessel 10 as shown in FIG. 1 so that the vessel 10 may be charged, usually with scrap metal. The cover 12 is then positioned over the furnace body 10 in the manner discussed above and lowered into engagement with an open upper end 23 of vessel 10. A fuel such as propane and air or oxygen are then injected through the tuyeres 11 to preheat the scrap charge. A typical gas injection will be oxygen injected through the inner tuyere pipe 75 and approximately an equal volume of propane through outer tuyere pipe 76. The electrodes 58 are preferably retained in heir elevated position during this preheat period to minimize oxidation of the electrodes. After the scrap has been preheated to a temperature of from about 1,600° to 1,800° F, the preheating operation will be halted and the electrodes lowered into position to complete melting of the charge in the conventional manner. The hot gases generated during the preheating stage and during the final melt down operation are conducted through the smoke elbow 68 and conduit 70 to the inlet of the gas cleaning system 71.

Th melt down period is generally the most expensive stage in electric furnace operation because the consumption rate of both powder and electrodes is highest during this interval. The use of the tuyeres 11 to preheat the scrap substantially reduces the cost of the melt down operation.

During the melt down period some oxidation of the charge occurs. Final oxidation is effected with the use of the tuyeres 11. Toward this end the electrodes 58 and the cover 12 are raised and swung away from the vessel 10. At this point, a hot metal charge may be added to the melt 31. The vessel 10 is then tilted to its position shown in FIG. 5. This places the inner end of tuyeres 11 below the level of melt 31. It will be appreciated that in order to prevent the melt 31 from entering the tuyere pipes 75 and 76 each is connected to a source of an inert gas such as argon. The gas pressure will, of course, be sufficient to overcome the molten metal head. After the vessel 10 has been tilted to the position shown in FIG. 5, the hood 15 is swung into position above said vessel and lowered into engagement with its open upper end 23. The valve 141 in conduit 137 may then be opened to couple the vessel 10 to the gas cleaning system 71.

The oxidation period is commenced by injecting oxygen under a suitable pressure through inner inner tuyere pipe 75 while a hydrocarbon shielding gas, such as propane, is injected through the annular tuyere passage 77. Oxidation reaction occur as the injected oxygen reacts with impurities in the melt such as silicon, manganese, phosphorous and carbon. The shielding gas which is injected through the annular tuyere space 77 acts to prolong life of the tuyeres 11 and the surrounding refractory. Of course, oxidation practice must be varied with different grades of steel. For example, low-carbon steels require a relatively high degree of oxidation. As the oxidation progresses, the temperature of the bath rises as the result of the oxidation of carbn which increases the fluidity of the bath to promote the rise of inclusions to the bath surface and into the slag. The reaction of oxygen with carbon forms CO gas, and this gas generated in the bath gives rise to the boil. The generated heat and vigorous boiling action in the metal bath promotes the desired reactions as well as mixing to enhance homogeneity and cleanliness of the final product. In some basic processes, limestone has been used to accomplish the oxidation reaction by the calcination of the limestone. The limestone was normally added to the melt through the top of the vessel. With the present invention, the limestone may be injected in powdered form with the oxygen through the central tuyere pipe 76.

By monitoring the composition of the gases generated during the oxidation period and directed through the hood 15, the terminal point of the desired oxidation reactions can be determined with substantial accuracy. Such techniques are well known in the art and need not be described in detail.

After the oxidation period, desulfurization may be desirable. Toward this end, it is desirable to provide relatively high bath temperature, extremely low oxygen content in the bath and in the slag and to render the slag highly basic. For example, the temperature should perferably be in excess of 2,800° F, the basicity of the slag expressed as a ratio of % $CaO$/% $SiO_2$ is preferably greater than two and the bath oxygen level substantially below the oxygen equilibrium percentage for the particular carbon level and bath temperature. Therefore, after the oxidation period has been completed and while the vessel is tilted for gas injection, an inert gas such as argon and powdered calcium oxide in suitable form such as burnt lime are injected through the inner tuyere and the same inert gas injected through the outer tuyere. If additional heat is required to promote the desired reaction, the furnace 10 may be returned to its initial untilted position, the hood 15 removed and the cover 12 placed atop the vessel. The vessel 10 may then be tilted for injection of argon and burnt lime and the electrodes 58 energized to provide the required heat. It will be understood that the terminal end of duct 70 will be sized to receive gases discharged from elbow 68 while the vessel 10 is in its tilted position with the cover 12 in place.

If stainless or silicon steels are to be produced, a mixture of oxygen and an inert gas such as argon may be fed into the bath through the tuyere system 11. The argon reduces the partial pressure of CO in the bath so that a greater reduction in the carbon level may be obtained.

Final adjustments can also be made by the introduction of the requisite materials through the tuyere system 11. For example, if the carbon level is too low, a powdered carbonaceous material or a hydrocarbon gas can be introduced into the melt along with an inert gas such as argon or nitrogen. If a hydrocarbon fluid is introduced for recarburization, normally through the outer tuyere passage 76, an inert gas such as argon or nitrogen will be introduced through the inner tuyere passage 75. On the other hand, if a reduction in the carbon level is required, oxygen is introduced through the inner tuyere passage 75 during this period and a hydrocarbon gas introduced through outer passage 76. Also, the bath can be efficiently purged of hydrogen or nitrogen by the introduction of an inert gas such as argon. Additionally, bath temperature can be closely controlled either by the introduction of oxygen to increase temperature, or coolants such as lime or iron ore entrained in an inert carrier gas, such as argon. In this manner, the use of the tuyere system 11 in the vessel 10 substantially reduces the operating time required because the various chemical reactions are facilitated by the introduction of oxidizing and reducing materials through the bath rather than relying on the interaction between the bath and the slag. The desired chemical reactions are also promoted as a result of the mixing action caused by the introduction of gases through tuyere system 11.

As an alternate method of operation, the oxygen blow may be discontinued following the completion of the oxidation period. Accordingly, an inert gas such as argon will be delivered to each of the inner and outer tuyere pipes until the vessel 10 is again repositioned in its unpivoted position and the inner ends of the tuyeres 11 will be above the level of the molten metal bath 31. At this point an inert gas, air or low pressure oxygen is perferably delivered through the inner tuyere pipe 75 and an inert gas or low pressure hydrocarbon delivered through the outer tuyere pipe 76 for the purpose of cooling the metallic tuyere pipe material. In the production of carbon steels, wherein a single slag is employed, the smoke hood 15 will be raised and swung away from the vessel 10 whereupon the latter may be repositioned in its unpivoted position. The furnace cover 12 will then be swung over the vessel 10 and lowered into position. Material to form a reducing slag such as powdered lime, limestone, fluorspar, burnt lime may be added to the slag either by charging through the open upper end of the vessel 10 prior to the positioning of the cover 12 or entrained in the inert gas stream entering the vessel through tuyeres 11. Electrodes 58 are also lowered and an arc struck to complete the refining period.

If a double slag process is to be performed, the slag door 35 is opened after the smoke hood 15 has been raised and the vessel 10 is pivoted further clockwise as viewed in FIG. 2 and the charge removed in any conventional manner such as by raking. After deslagging has been completed, the materials such as burnt lime, fluorspar, silica sand, and powdered coke, which are employed for the making of the second or reducing slag are added. The addition of the slag materials may be either directly through the open upper end of the vessel or by being entrained as powder in the inert gas stream being injected through the tuyeres 11, except in the case of coke which for safety reasons would not be inserted into the gas system. It will be appreciated that after the addition of the materials for the second slag the cover 12 is repositioned on the vessel 10 and the electrodes 58 lowered into position for striking an arc during the continuance of a refining operation. After the furnace cover 12 has been repositioned, refining, desulfurization and the necessary final additions may be provided in the furnace vessel 10 and final temperature adjustments are made in the manner of normal electric arc furnace operation. Also, the alloying elements or carbon which may be required for recarburization may be entrained in an inert gas for injection through tuyeres 11.

While only a few embodiments of the invention are shown and described, it is not intended to be limited thereby but only by the scope of the appeneded claims.

We claim:

1. An electric arc furnace including a furnace vessel constructed and arranged for containing a quantity of molten metal, means for positioning at least one electrode adjacent said molten metal to affect the heating thereof by means of an arc,
   tuyere means extending through said furnace vessel and having an outer end constructed and arranged to be connected to a gas source, and an inner end disposed within said vessel for injecting said gas into said vessel,
   means for pivoting said vessel about a substantially horizontal axis between a first and second position, said tuyere means being located in said furnace with its inner end above the level of molten metal when said vessel is in its first position and below the level thereof when said vessel is in its second position,
   said tuyere means including a first pipe means and a second pipe means at least partially surrounding and spaced from said first pipe means whereby different fluids may be delivered simultaneously through said means,
   and means for selectively coupling said first and second pipe means to selective fluid sources whereby one of said pipe means may be connected to a source of fuel and the other of pipe means may be connected to a source of an oxygen containing gas when said vessel is in its first position for preheating the metallic charge in said vessel and whereby process fluids may be delivered through said first and second pipe means to the metallic charge when said vessel is in its second position.

2. The furance set forth in claim 1 wherein said tuyere means includes an inner pipe and an outer pipe spaced from said inner pipe whereby different gases may be delivered simultaneously through said pipes.

3. The electric arc furnace set forth in claim 1 and including a furnace roof having at least one aperture formed therein, means for moving said electrode through said aperture and into said vessel, and means for moving said roof and electrode between a first position wherein said roof engages said vessel and a second remote position.

4. The arc furnace set forth in claim 3 and including hood means for connecting said vessel to a gas cleaning system and means for moving said hood means from a first position wherein said hood means engages said vessel and a second remote position.

5. The arc furnace set forth in claim 4 and including gas exit means mounted on said furnace roof and means disposed adjacent said vessel and in proximity with said gas exit means when said furnace roof is in its engaged position for coupling said gas exit means to said gas cleaning means.

6. The arc furnace set forth in claim 1 and including a slag opening formed in said vessel and in the side thereof facing said direction of pivotal movement, said tuyere means being formed in said vessel adjacent said slag opening whereby further pivotal movement of said vessel in said first direction will permit removal of slag from said molten metal and maintain said tuyere means beneath the level thereof.

7. The furnace set forth in claim 1 wherein said vessel has a hearth at its lower end and a side wall, said tuyere means extending through said side wall and generally downwardly through said hearth.

8. The furnace set forth in claim 7 wherein said tuyere means includes an inner pipe and an outer pipe spaced from said inner pipe whereby different gases may be delivered simultaneously through said pipes.

9. The furnace set forth in claim 8 and including a furnace roof having at least one aperture formed therein, means for moving said electrode through said aperture and into said vessel, and means for moving said roof and electrode between a first position wherein said roof engages said vessel and a second remote position.

10. The furnace set forth in claim 9 and including hood means for connecting said vessel to a gas cleaning system and means for moving said hood means from a first position wherein said hood means engages said vessel and a second remote position.

11. The furnace set forth in claim 10 and including gas exit means mounted on said furnace roof and means disposed adjacent said vessel and in proximity with said gas exit means when said furnace roof is in its engaged position for coupling said gas exit means to a gas cleaning means.

12. The furnace set forth in claim 11 and including a slag opening formed in said vessel and in the side thereof facing said direction of pivotal movement, said tuyere means being formed in said vessel adjacent said slag opening whereby further pivotal movement of said vessel in said first direction will permit removal of slag from said molten metal and maintain said tuyere means beneath the level thereof.

13. The apparatus set forth in claim 1 and including a first source of a hydrocarbon fluid, a second source of an oxygen containing gas, said selective coupling means including a first flow control means for controlling the flow of said oxygen containing gas to said first tuyere pipe means and second flow control means for controlling the flow of hydrocarbon containing gas to said second tuyere pipe means, said hydrocarbon containing gas oxidizing when said vessel is in its first position to preheat a metal charge in said vessel, said hydrocarbon containing fluid being injected into said metal bath in surrounding relation to said oxygen containing gas when said vessel is in its second position.

* * * * *

UNITED STATES PATENT OFFICE
CERTIFICATE OF CORRECTION

Patent No. 3,812,275　　　　　　　　　　Dated May 21, 1974

Inventor(s) Eberhard G. Schempp and Jai K. Pearce

It is certified that error appears in the above-identified patent and that said Letters Patent are hereby corrected as shown below:

In the claims, claim 1, column 9, line 58, after "said" and before "means" insert --pipe--.

Signed and sealed this 8th day of October 1974.

(SEAL)
Attest:

McCOY M. GIBSON JR.　　　　　　　　　C. MARSHALL DANN
Attesting Officer　　　　　　　　　　Commissioner of Patents